United States Patent
Merchant

(10) Patent No.: US 6,507,564 B1
(45) Date of Patent: Jan. 14, 2003

(54) METHOD AND APPARATUS FOR TESTING AGING FUNCTION IN A NETWORK SWITCH

(75) Inventor: Shashank Merchant, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/315,972

(22) Filed: May 21, 1999

(51) Int. Cl.[7] .................................................. H04J 1/16
(52) U.S. Cl. ........................ 370/244; 370/371; 370/429
(58) Field of Search .................................. 370/412, 429, 370/402, 244, 241–243, 245, 252, 369–371; 707/104; 714/719; 711/118, 156; 709/243

(56) References Cited

U.S. PATENT DOCUMENTS

| 5,515,376 A | * | 5/1996 | Murthy et al. ............... 370/402 |
| 5,909,686 A | * | 6/1999 | Muller et al. ................ 707/104 |
| 6,345,371 B1 | * | 2/2002 | Lam ........................... 714/719 |

\* cited by examiner

Primary Examiner—Hassan Kizou
Assistant Examiner—John Pezzlo

(57) ABSTRACT

A network switch configured for switching data packets across multiple ports uses an address table to generate frame forwarding information. The address table includes aging information used by an internal decision making engine so that aged entries are invalidated after a programmable period of time. The network switch includes a test mode so that the aging function is able to be quickly tested by an external test device.

18 Claims, 12 Drawing Sheets

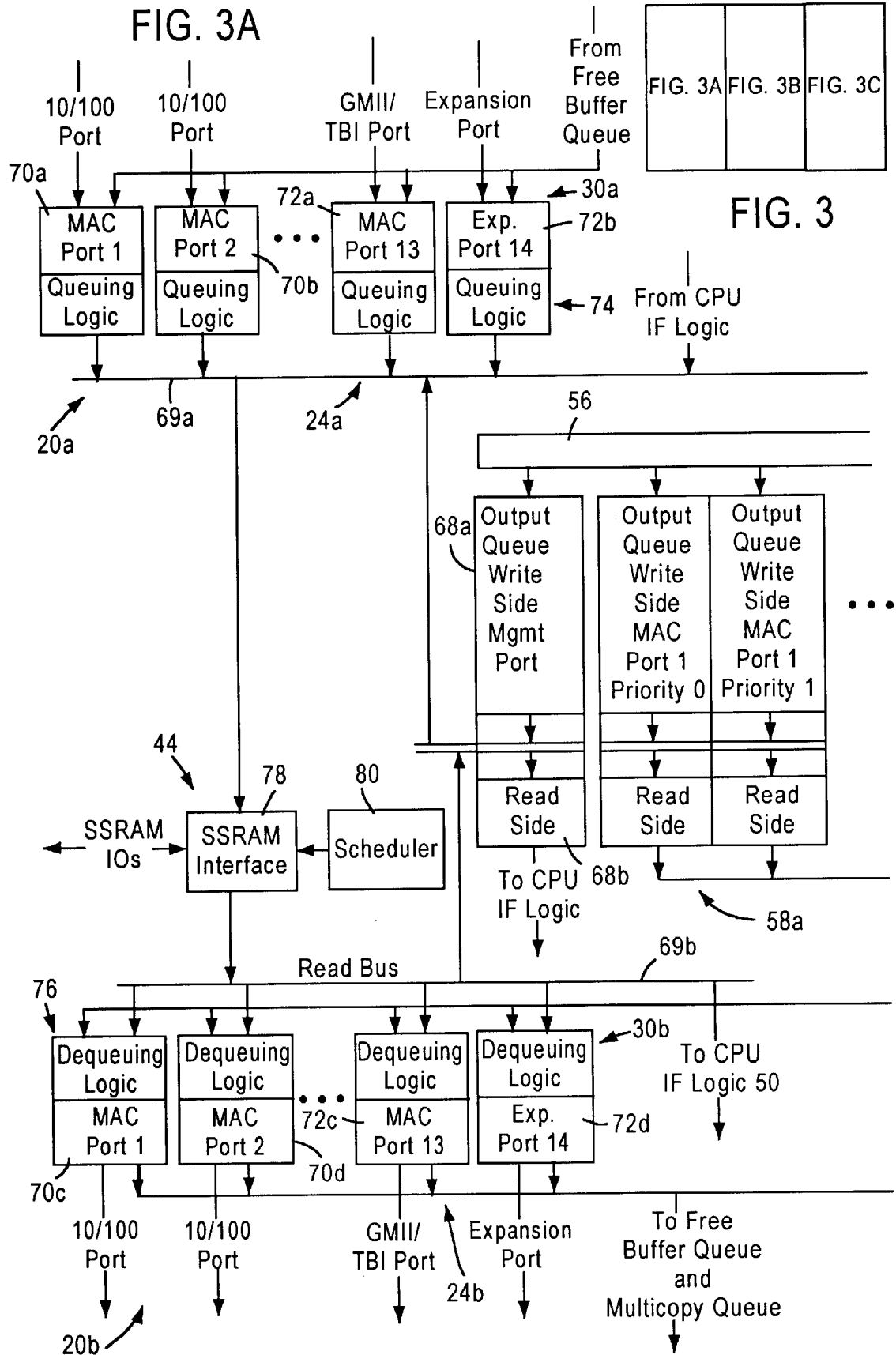

METHOD AND APPARATUS FOR TESTING AGING FUNCTION IN A NETWORK SWITCH

TECHNICAL FIELD

The present invention relates to network communications and more particularly, to testing an aging function in a network switch.

BACKGROUND ART

In computer networks, a plurality of network stations are interconnected via a communications medium. For example, Ethernet is a commonly used local area network scheme in which multiple stations are connected to a single shared serial data path. These stations often communicate with a switch located between the shared data path and the stations connected to that path. Typically, the switch controls the communication of data packets on the network.

The network switch includes switching logic for receiving and forwarding frames to the appropriate destinations. When all of the stations connected to the network are simultaneously operating, packet traffic on the shared serial path can be heavy with little time between packets.

One arrangement for generating a frame forwarding decision uses a direct addressing scheme, where the network switch includes a fixed address table storing switching logic for the destination addresses. For example, a frame may be received by the network switch with header information indicating the source address and destination address of the frame. The switching logic then uses the source address and destination address to search the address table to find the appropriate frame forwarding information. The switch then uses this information and sends the frame to the appropriate port(s).

Such prior art arrangements typically make additions to the network difficult to implement. In addition, such arrangements often cannot delete or invalidate a station from the address table when the station is quiet, i.e., not transmitting data for a given period of time. This difficulty in deleting stations from the address table may increase the latency of the switch by increasing the time spent searching non-active station entries in the address table for frame forwarding information.

SUMMARY OF THE INVENTION

There exists a need for a switching device that includes an "aging" function to invalidate address entries in an address table in a network switch and also includes a test mode for testing the aging function.

There is also a need for a method of testing an aging function in a network switch in an efficient manner.

These and other needs are met by the present invention, where a multiport switch includes an address table that stores address entries used by an internal decision making engine to make frame forwarding decisions. The internal decision making engine includes an aging function whereby entries are "aged" and invalidated based on information stored in the address table. The invalidated entries can then be overwritten. The multiport switch also includes a test mode whereby the aging function can be tested in a relatively quick manner by an external test device to ensure that the aging function is operating properly.

According to one aspect of the invention, a network switch is configured for controlling the communication of data frames between stations. The switch includes a table for storing address information as address entries in a plurality of bins with the address entries containing an address hit field and an aging override field. The switch also includes a programmable register configured to receive a test mode activation signal from an external test device and a control device configured to operate in a test mode based on the contents of the programmable register. The control device, when operating in the test mode, is configured to poll the address entries every predetermined period of time based on a timer value and determine whether to invalidate an address entry based on the contents of the address hit field and the aging override field. The control device is further configured to invalidate an address entry and rearrange the respective bin, based on the contents of the address hit field and aging override field.

Another aspect of the present invention provides a method for testing an aging function in a multiport switch that controls communication of data frames between stations. The method includes storing address entries in the address table with the address entries including an address hit field and an aging override field. The method also includes transmitting a test mode activation signal to a decision making engine located on the multiport switch and polling the address entries every predetermined period of time. The method further includes determining whether to invalidate an address entry based on the contents of the address hit field and the aging override field, invalidating an address entry and rearranging a particular bin, based on the determining step. The method also includes reading the contents of the address table to determine if the aging function operated properly.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
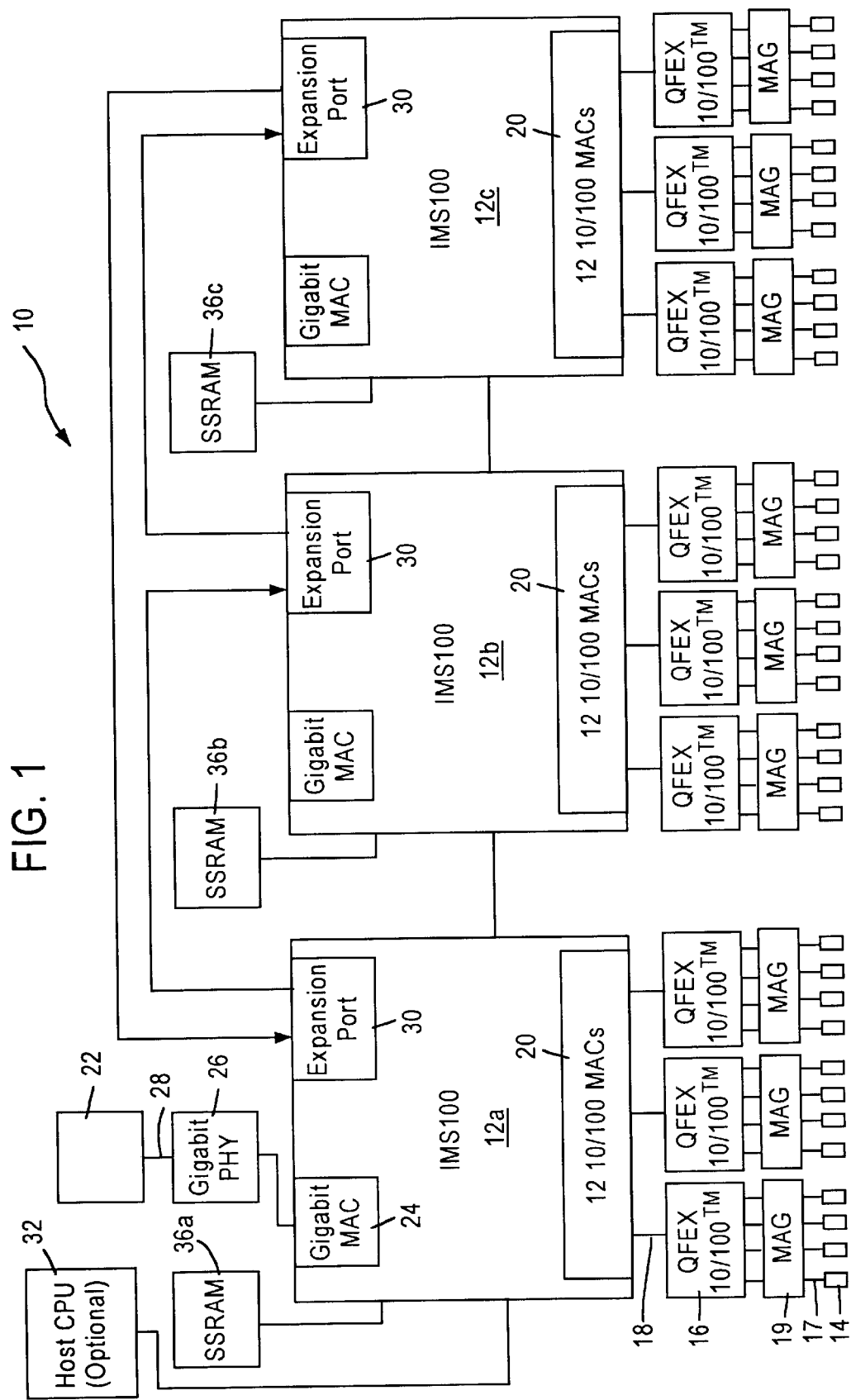
FIG. 1 is a block diagram of a packet switched network including a multiple port switch according to an embodiment of the the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
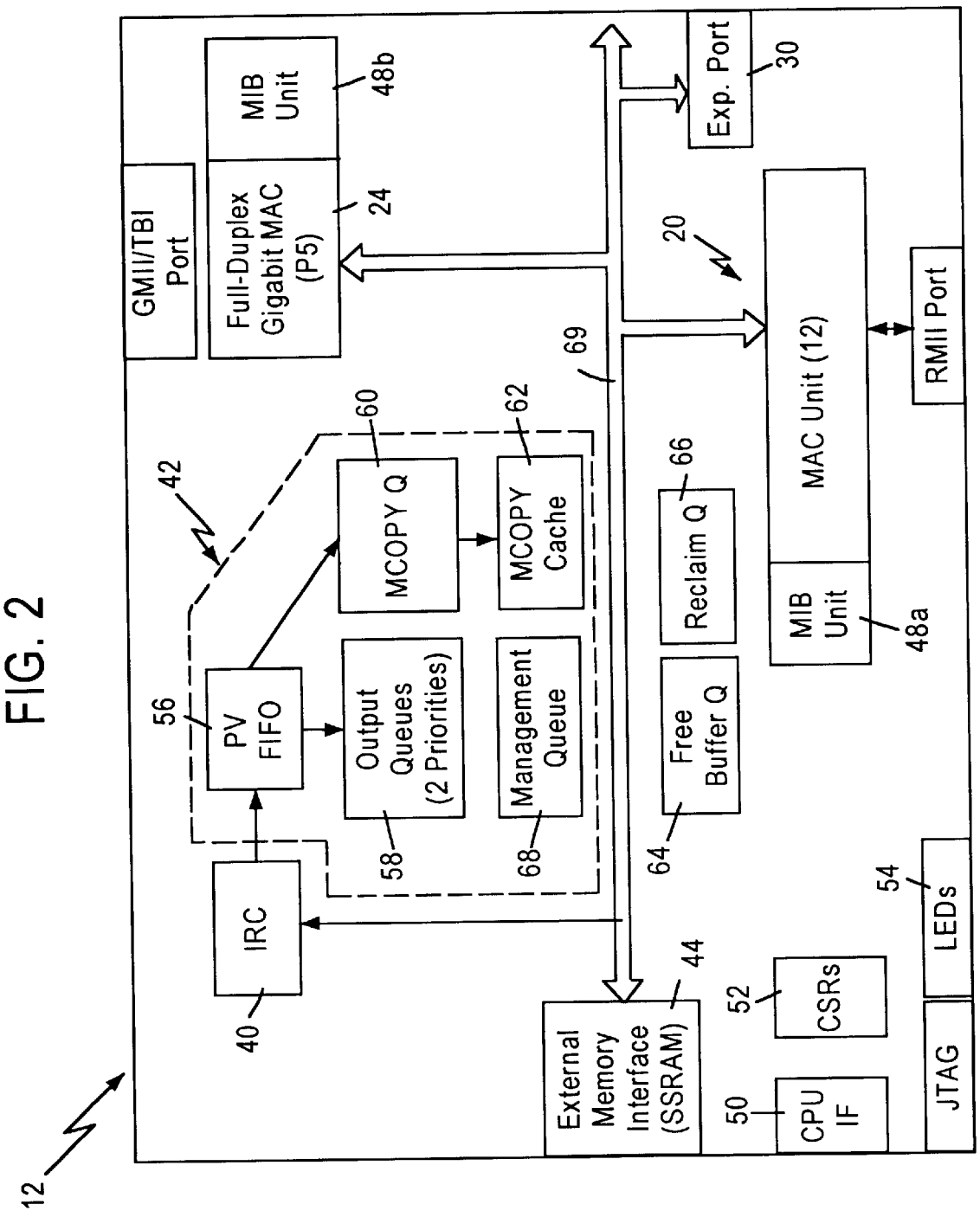
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figure 3B:
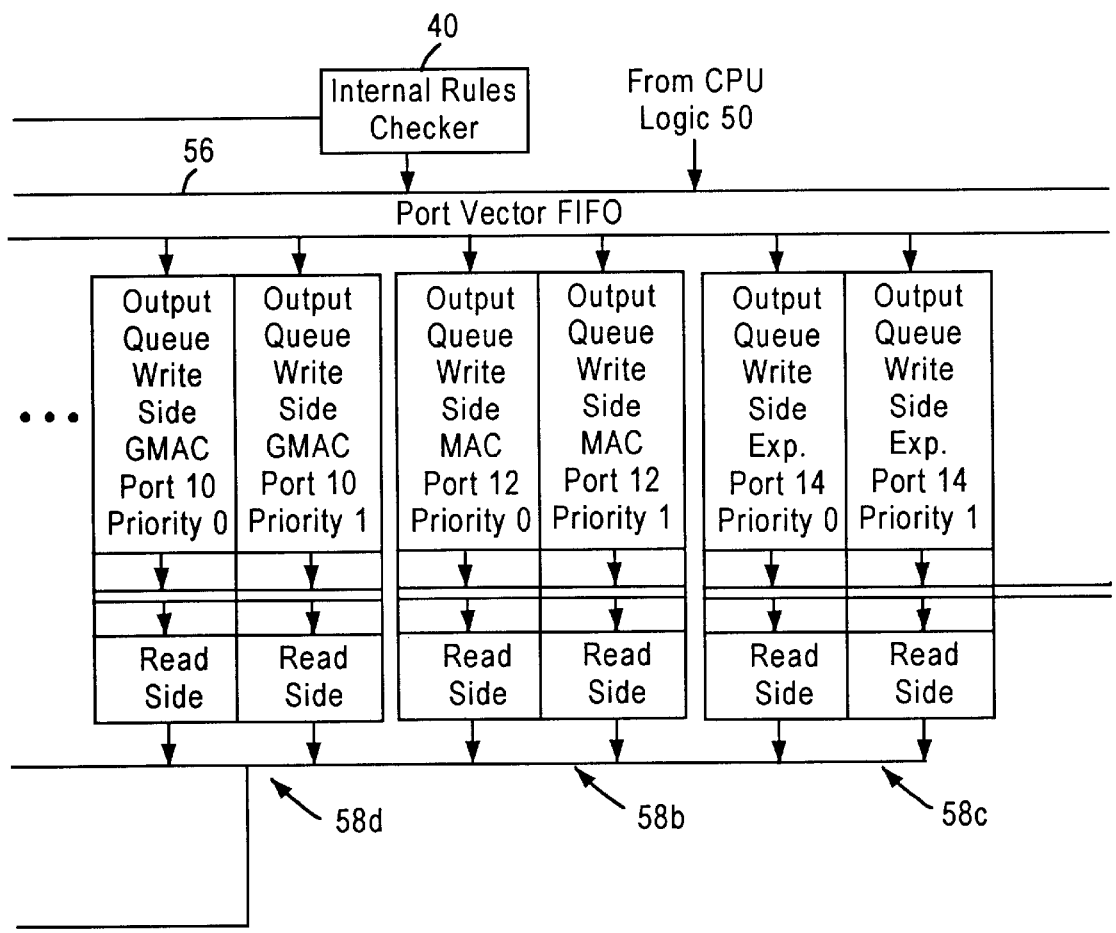
FIG. 3 is a detailed block diagram illustrating the switching subsystem of FIG. 2.
Figure 3C:
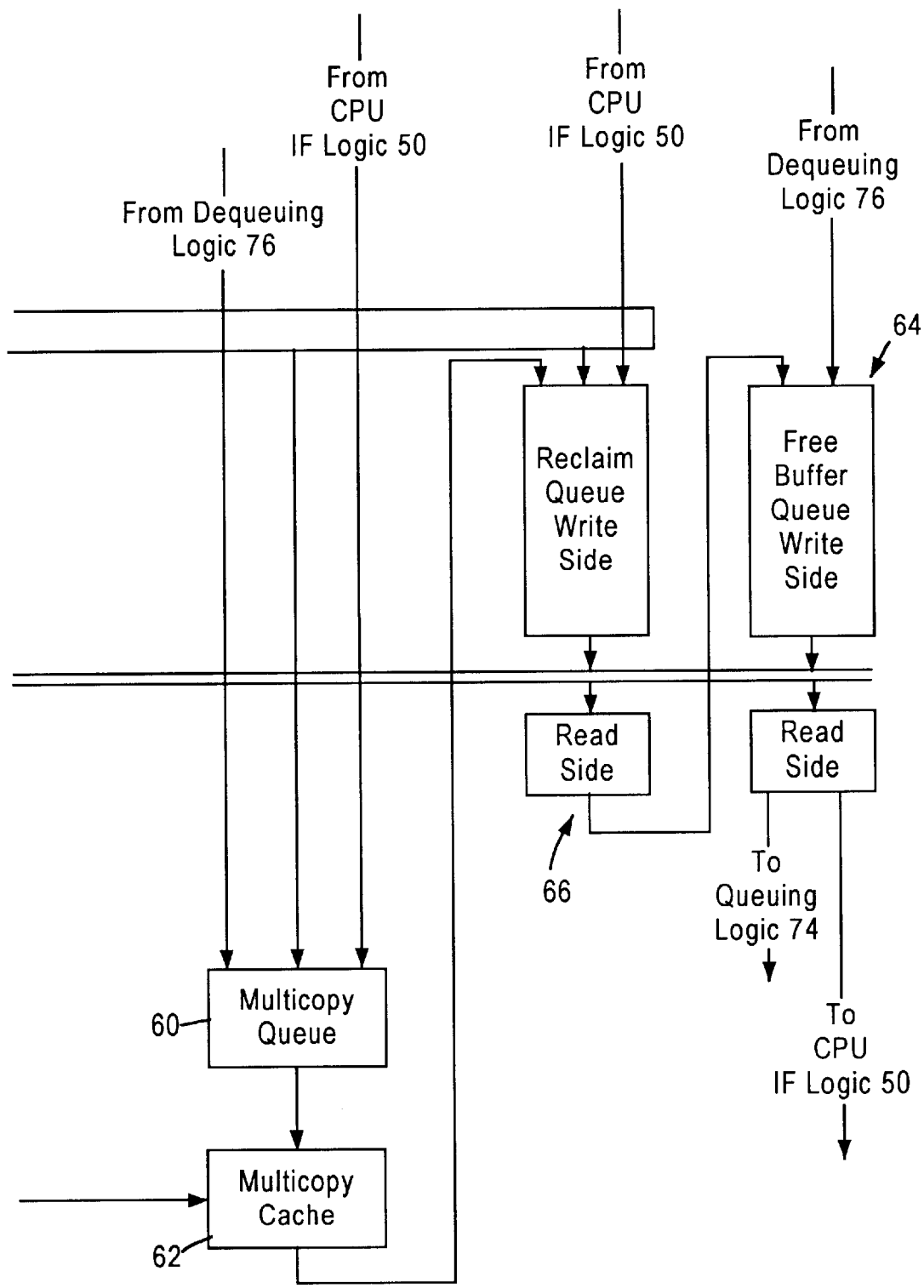

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 are described below.

Aging Function and Testing Aging Function

The present invention is directed to using the IRC 40 to provide an aging function and more particularly to testing the aging function. A description will first be given of the IRC 40 and the aging function, followed by the detailed description of the method and apparatus for testing the aging function.

As described previously, the switch subsystem 42 provides the switching logic for receiving and forwarding frames to the appropriate output ports. The forwarding decisions, however, are made by the IRC 40 located on the switch 12.

Figure 4:
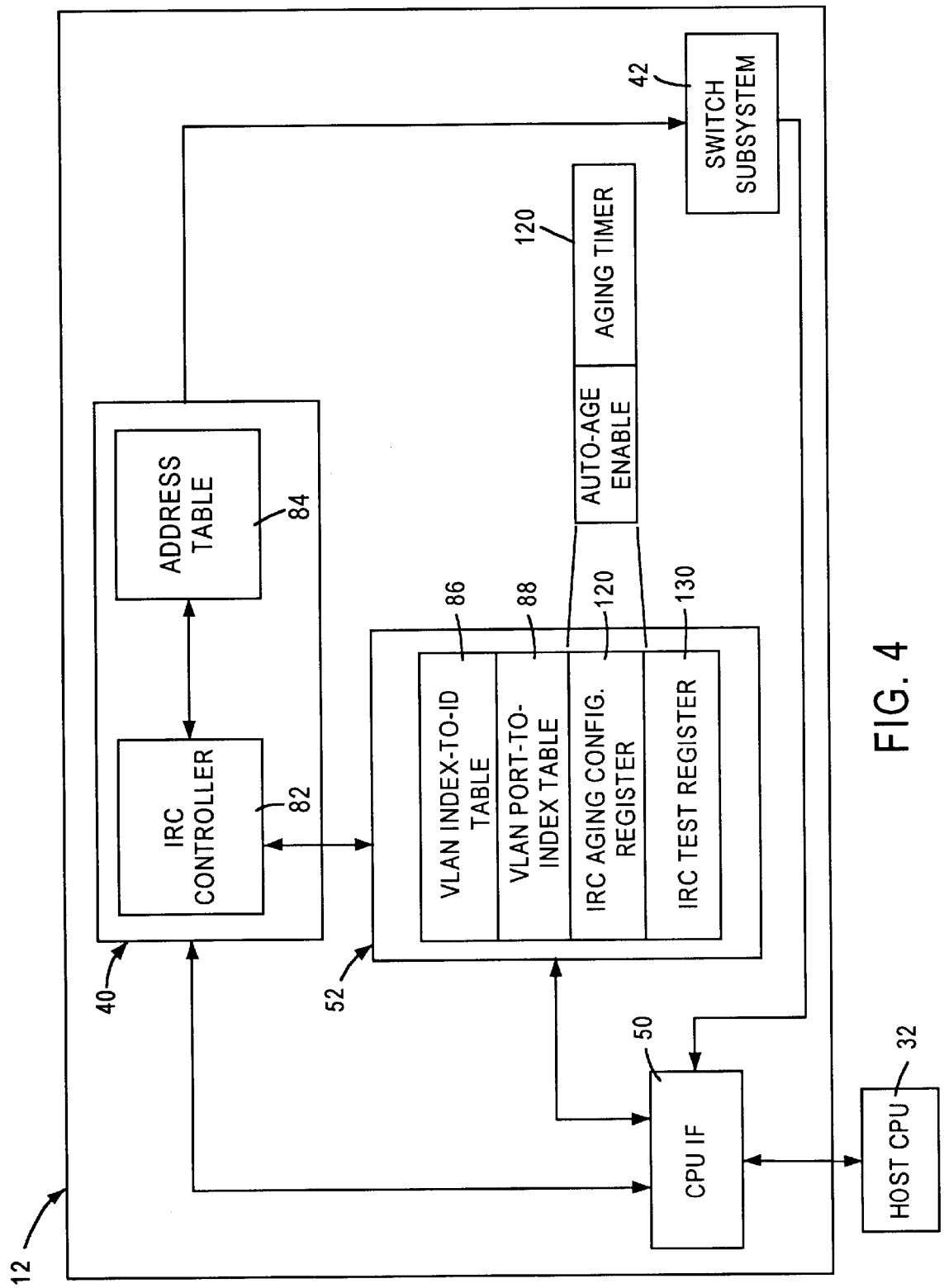
FIG. 4 is a block diagram of a system including the internal rules checker of FIG. 2 in accordance with an embodiment of the present invention.

FIG. 4 illustrates the IRC 40 which includes an IRC controller 82 and address table 84. In the exemplary embodiment, the address table 84 is located within the IRC 40. In alternative embodiments, the address table may be located outside the IRC 40 within another part of the switch 12 or even external to the switch 12.

In the exemplary embodiment, the address table 84 supports 4096 user addresses and capabilities for 64 unique virtual local area networks (VLANs). However, the number of addresses and VLANs supported may be increased by expanding the table size. VLANs provide "broadcast domains" whereby broadcast traffic is kept "inside" the VLAN. For example, a specific VLAN may contain a group of users at a high level of an organization. When sending data to this group of users, the data may include a specific VLAN identifier associated with this particular group to ensure that only these users receive the data. These VLAN groupings can be thought of as "sub-networks" within a larger network.

Figure 5:
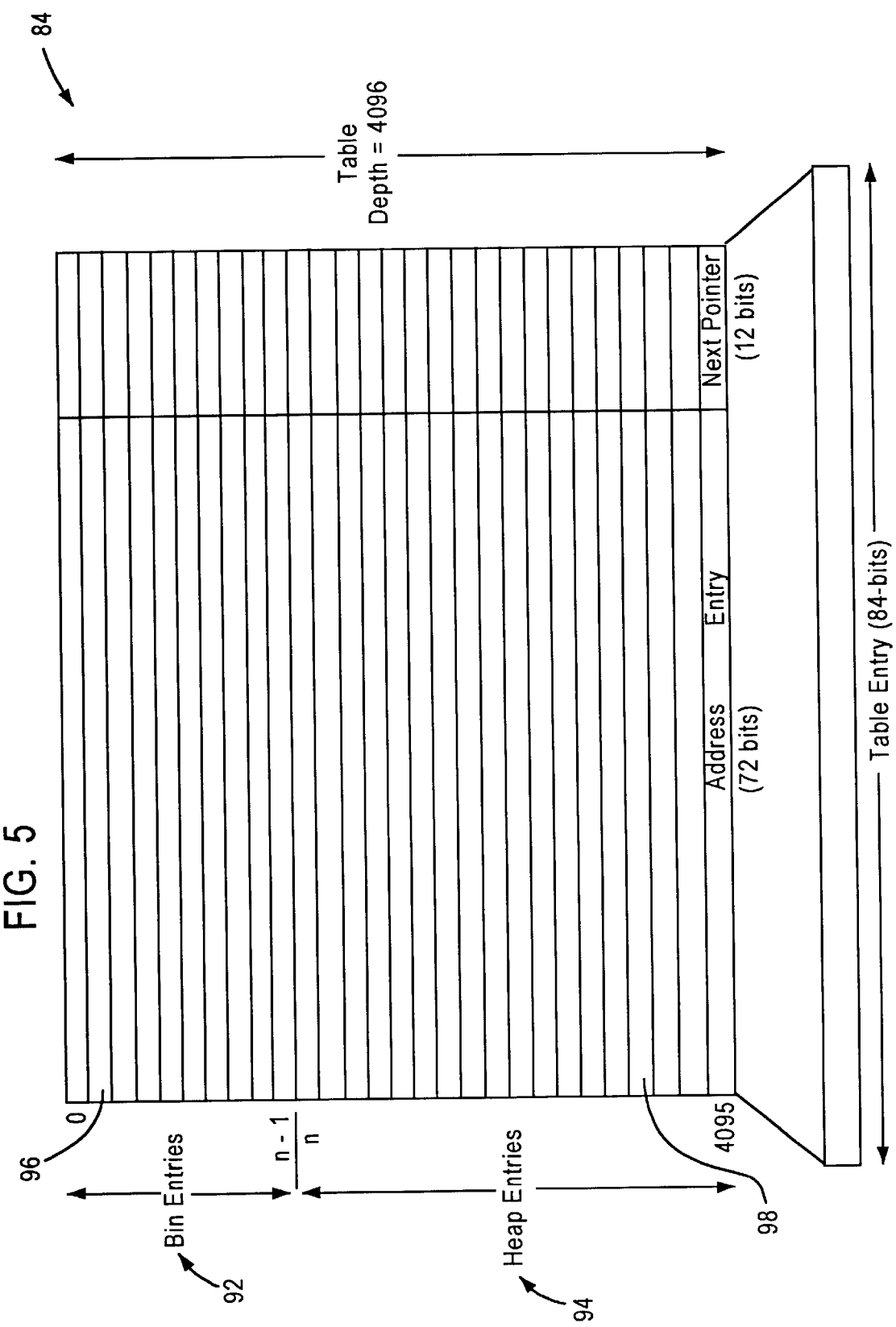
FIG. 5 illustrates the composition of the IRC address table of FIG. 4.

FIG. 5 illustrates the organization of the IRC address table 84. The IRC address table 84 contains an array of 4096 entries. The first "n" entries 92 are referred to as "bin entries" and have addresses from "0" to "n−1". The remaining entries 94 are referred to as "heap entries" and have addresses from "n" to "4095". Each of the table entries includes a 72-bit address entry field and a 12-bit "next pointer" field.

Figure 6:
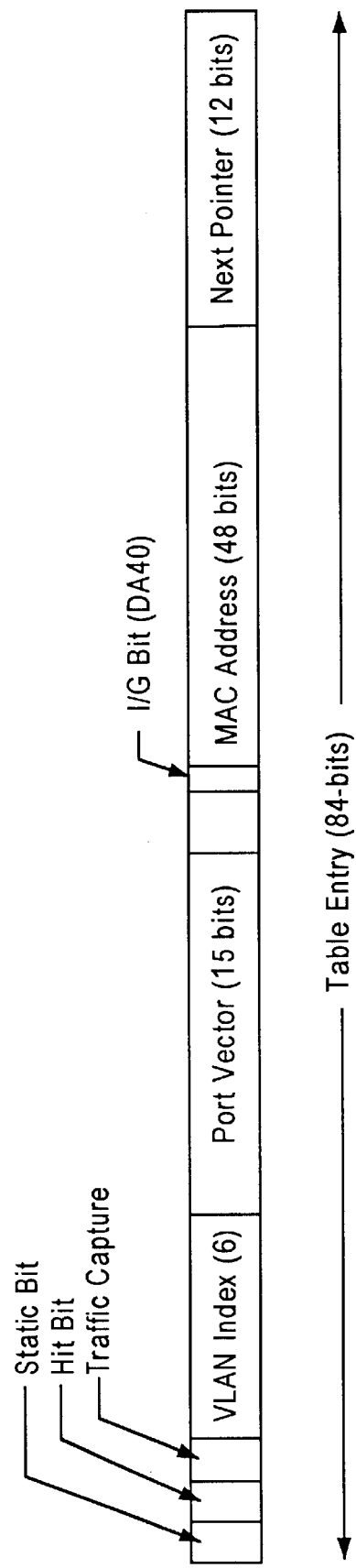
FIG. 6 illustrates the format of an IRC address table entry of the IRC address table of FIG. 5.

FIG. 6 illustrates the composition of each 84-bit table entry shown in FIG. 5. The hit bit is used by the IRC controller 82 for address entry "aging", discussed in more detail below, to invalidate entries from the address table 84. The static bit, also referred to as an aging override bit, is used to prevent invalidation of an address entry.

The traffic capture bit identifies traffic capture source and destination MAC addresses for mirroring MAC conversations to the management queue 68.

The VLAN index field is a 6-bit field used to reference a 12-bit VLAN identifier (ID). A VLAN index-to-VLAN ID table 86, shown in FIG. 4, contains the mapping associations. The switch 12 receives both tagged and untagged frames. When the switch 12 receives untagged data frames, i.e., without VLAN tag information, the IRC 40 assigns a VLAN index from a VLAN port-to-index table 88, based on the receive port on which the frame is received. The VLAN index-to-ID table 86 and the VLAN port-to-index table 88 are located with the configuration and status registers 52. However, in alternative configurations, the tables 86 and 88 may be located within the IRC 40.

The port vector is a 15-bit field that provides a forwarding descriptor with a vector identifying the ports to which the frame should be forwarded.

The MAC address field is a 48-bit field that includes addresses for both source addresses and destination addresses. The addresses can be unicast, multicast or broadcast. An individual/group (I/G) bit is also included in the MAC address field.

In the exemplary embodiment of the present invention, the host CPU 32 functions as the management entity and is connected to the IRC 40 via the CPU IF 50. Alternatively, a management MAC may be connected to the CPU IF 50 to function as the management entity.

The host CPU 32 is responsible for initializing the values in the address table 84. Upon power-up, the host CPU 32 loads values into the bin entries 92 based on the network configuration, including VLAN configurations. The heap entries 94 are not fixed at power-up and are used for adding entries to the address table 84. The IRC 40 uses the specific fields of the address table 84 to make frame forwarding decisions when frames are received in the switch 12. More specifically, the IRC controller 82 includes control logic to search the address table 84 for frame forwarding information. From the information found in the address table 84, the IRC controller 82 creates a forwarding descriptor, which includes the frame pointer, the forwarding port vector, the receive port number, the VLAN ID, the priority class and a control opcode. The IRC controller 82 then transmits the forwarding port vector to the port vector FIFO 56 for queuing, as shown in FIG. 3.

To generate the forwarding decision, the IRC controller 82 performs a source address (SA)/VLAN index search and a destination address (DA)/VLAN index search. The switch 12 needs to make frame forwarding decisions relatively quickly, since multiple data frames may be received by the switch 12 simultaneously. Hence, in the exemplary embodiment of the present invention, a hashing scheme is used to search only a subset of the address entries, as described below. The memory structure of FIG. 5 provides an indexed arrangement, where a given network address will be assigned to a corresponding bin. In other words, each bin entry 96 is configured to reference a plurality of table entries (i.e., heap entries) 98. Hence, the IRC controller 82 performs a search of the address table 84 by first accessing a specific bin 96 pointed to by a hash key, and then searching the entries within (i.e., referenced by) the corresponding bin to locate the appropriate match.

Each bin entry 96 is the starting point for the search by the IRC controller 82 for a particular address within the address table 84. A bin entry may reference no addresses (i.e., be empty), may reference only one address within the bin entry location, or may reference a plurality of addresses using a linked list chain structure.

Figure 7:
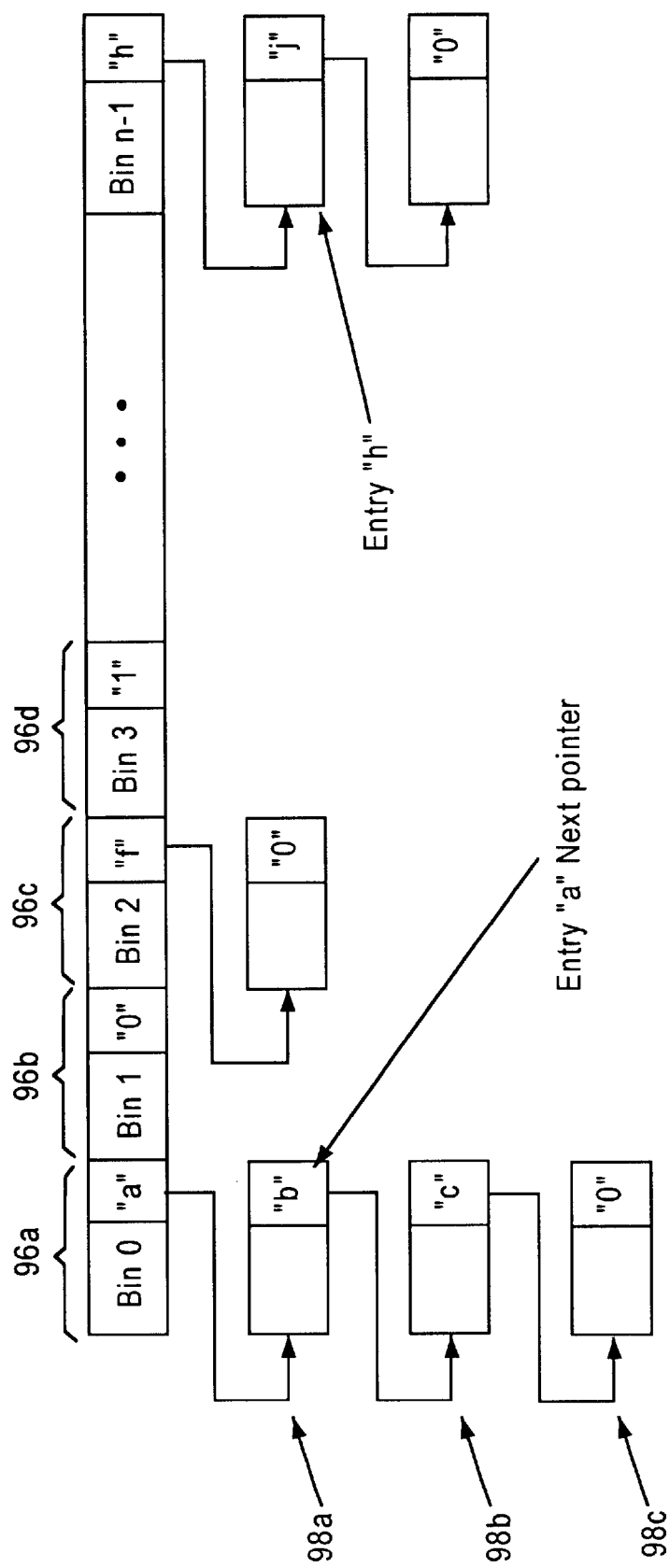
FIG. 7 illustrates linked list chains for identifying table entries relative to a selected bin.

FIG. 7 is a diagram illustrating bin entries referencing a different number of table entries. Each of the bin entries 96 and heap entries 98 includes the 72-bit address entry and a 12-bit "next pointer" field. The "next pointer" field associated with the bin entry 96 identifies the location of the next entry in the chain of linked list addresses. For example, Bin 3, 96d, of FIG. 7 does not have any associated table entries. In such a case, the 76-bit address entry equals zero (or another null value), and the bin's corresponding "next pointer" field will have a value of "1", indicating no entries for the corresponding bin. If a bin such as Bin 1, 96b, contains a single table entry, the bin entry will store the switching logic data for that single address in its address entry field, and store the value "zero" in the "next pointer" field, indicating there are no further address entries in the chain. Bin 0, 96a, however, references four addresses by using the "next pointer" field to identify the location of the next entry in the chain. The additional entries 96b–96d in the bin are linked in a linear list, as shown in FIG. 7. Thus, the first entry of Bin 0 is stored in the address entry field of the bin entry 96a and the next entry (heap entry 98a) is referenced by address entry "a" in the next pointer field of the bin entry 96a.

Figure 8:
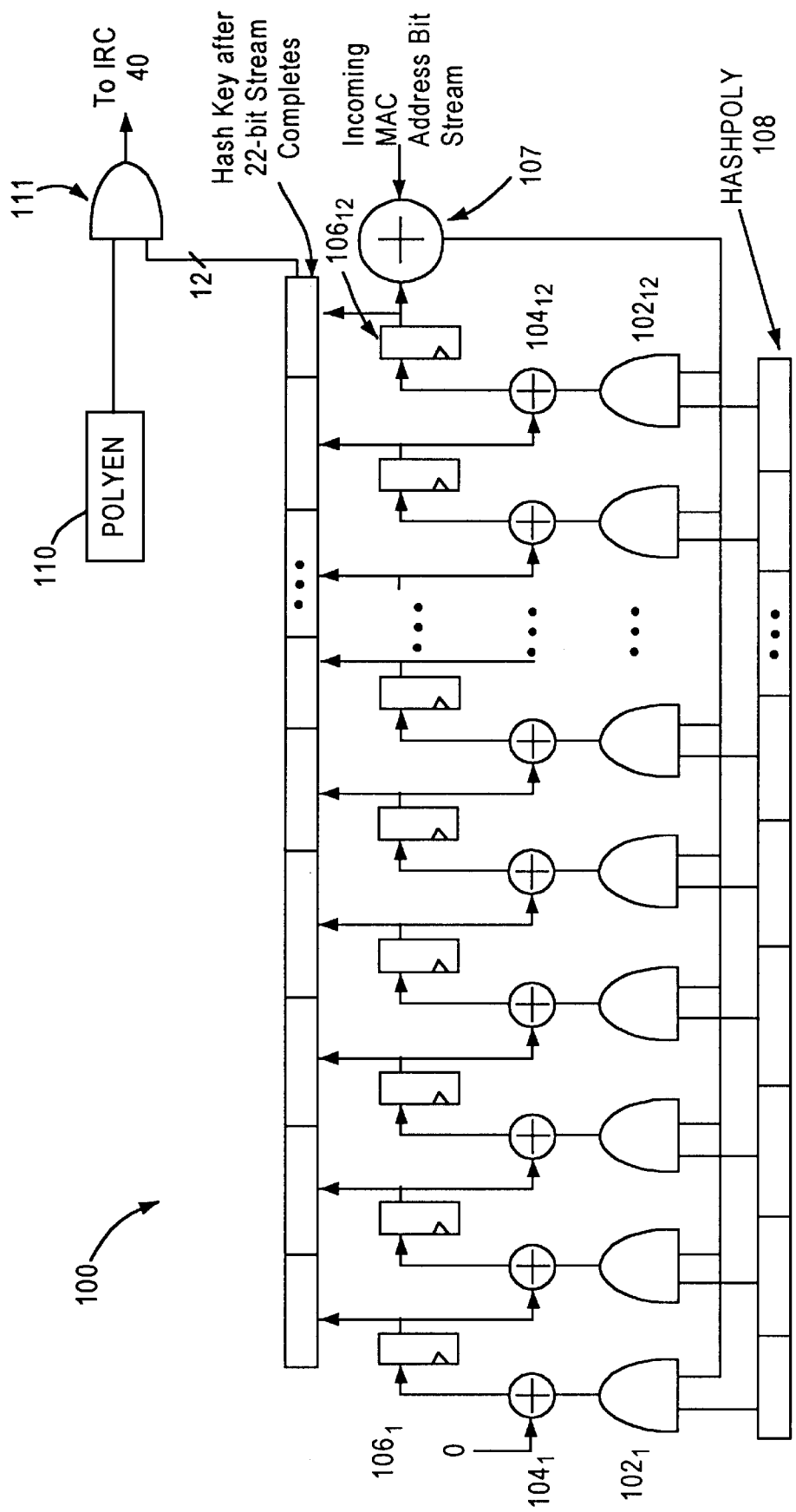
FIG. 8 illustrates a hash function circuit used with the internal rules checker of FIG. 2.

FIG. 8 is a block diagram illustrating an exemplary hash function circuit 100 used in accordance with an embodiment of the present invention. The hash function circuit 100 includes a series of AND gates 102, a series of exclusive OR (XOR) gates 104, and a shift register 106. A user-specified hash function, stored in a user-programmable register (HASHPOLY) 108, includes a 12-bit value defining the hash polynomial used by the hash function circuit 100. Exemplary hash polynomials for the hashing function of the present invention are $x^{12}+x^{10}+x^7+x^3+x^2+1$, which has a HASHPOLY of 0100 1000 1101, $x^{12}+x^{10}+x^5+x^3+1$, which has a HASHPOLY of 0100 0010 1001 and $x^{12}+x^{10}+x^8+x^7+x^4+x^2+1$, which has a HASHPOLY of 0101 1001 0101. The $x^{12}$ term is assumed to always equal "1", and therefore is not stored in the HASHPOLY register 108. Other polynomials may also be used for HASHPOLY based on the particular design requirements.

The hash function circuit 100 generates the hash key using the source address of the data packet according to a user-specified hash function. Initially, the IRC controller 82 concatenates the 16 least significant bits of the source address of the data packet with the VLAN index to create a search key. After the entire search key has been processed, the hash function circuit 100 outputs a 12-bit hash key.

From the 12-bit hash key, the IRC controller 82 calculates a bin number for searching the appropriate bin list in address table 86. More particularly, the IRC 40 uses the lower POLYEN bits of the hash key to generate the bin number. The bin number falls in the range of [0, n−1] where $n=2^{POLYEN}$ and the value of POLYEN is programmed by the host CPU 32 and stored in register 110. The hash key output by the hash function circuit 100 is output to a logic circuit, for example a 12-bit parallel AND gate 111, that selectively outputs the lower significant bits of the hash key based upon a polynomial enable value (POLYEN) stored in register 110. The field "POLYEN" defines how many bits of the hash key are used to create the bin number. For example, if POLYEN= 5, then the IRC 40 uses the lower five bits of the hash key. Hence, the hash key output by the logic circuit 100 is based upon masking the 12-bit hash key using the stored register value POLYEN in register 110.

After the bin number is calculated, the IRC controller 82 searches the bin list of the particular bin for an address entry whose address and VLAN index fields match the source address (SA) and VLAN index of the received frame.

If the IRC controller 82 finds an address entry whose address and VLAN index match the SA and VLAN index of the frame, the IRC controller 82 sets the hit bit for that address entry.

The IRC controller 82 then searches the address table 84 for an address entry whose address and VLAN index match the destination address (DA) and VLAN index of the frame. The IRC 40 uses the 12-bit hash function circuit 100, illustrated in FIG. 8, to generate a 12-bit hash key for the DANLAN index search. The IRC 40 uses the lower POLYEN bits of the hash key to calculate the bin number in the address table 84. The IRC 40 then searches the appropriate bin list for a DA/VLAN index match in the address table 84. If a match is found, the IRC controller 82 uses the port vector field of the address entry to generate the forwarding descriptor.

When the IRC 40 cannot find a DA/VLAN index match, the frame must be "flooded" to all members of the VLAN. Once the necessary forwarding information has been obtained, the IRC controller 82 outputs a forwarding descriptor to the switch subsystem 42, which outputs the received data packet to the appropriate ports based upon the information in the forwarding descriptor.

With reference to FIG. 6, each table entry in the IRC address table 84 includes a static bit field, i.e., an aging override field, and a hit bit field used by the IRC controller 82 in connection with an aging algorithm. As discussed previously, the address table 84 contains a finite number of address entries due to limited space on the switch 12. Therefore, in accordance with the present invention, the IRC controller 82 provides a method of "aging" address entries and invalidating these aged entries after a predetermined amount of time.

The IRC controller 82 automatically performs the aging function based on the contents of an IRC aging configuration register 120, shown in FIG. 4. The IRC aging configuration register 120 is located with the configuration and status registers 52. However, in alternative configurations, the IRC aging configuration register 120 may be located within the IRC 40.

Referring to FIG. 4, the IRC aging configuration register 120 includes an auto-aging enable field and an aging timer field. When the auto-aging enable field is set, the IRC controller 82 automatically polls each entry in the address table 84 at regular intervals, with the particular interval determined by the aging timer field in register 120. Upon power-up, the IRC controller 82 sets the timer field to 300 seconds as a default timer value.

The IRC controller 82 "walks" each IRC bin list and examines the hit and static bits. An address entry with a set static bit indicates that the address entry was programmed under Host CPU 32 control and the address entry is not aged by the aging algorithm. However, when both the hit and static bits are clear, the IRC 40 invalidates an aged address entry. The invalid address entry can then be overwritten by a new entry.

Figure 9:
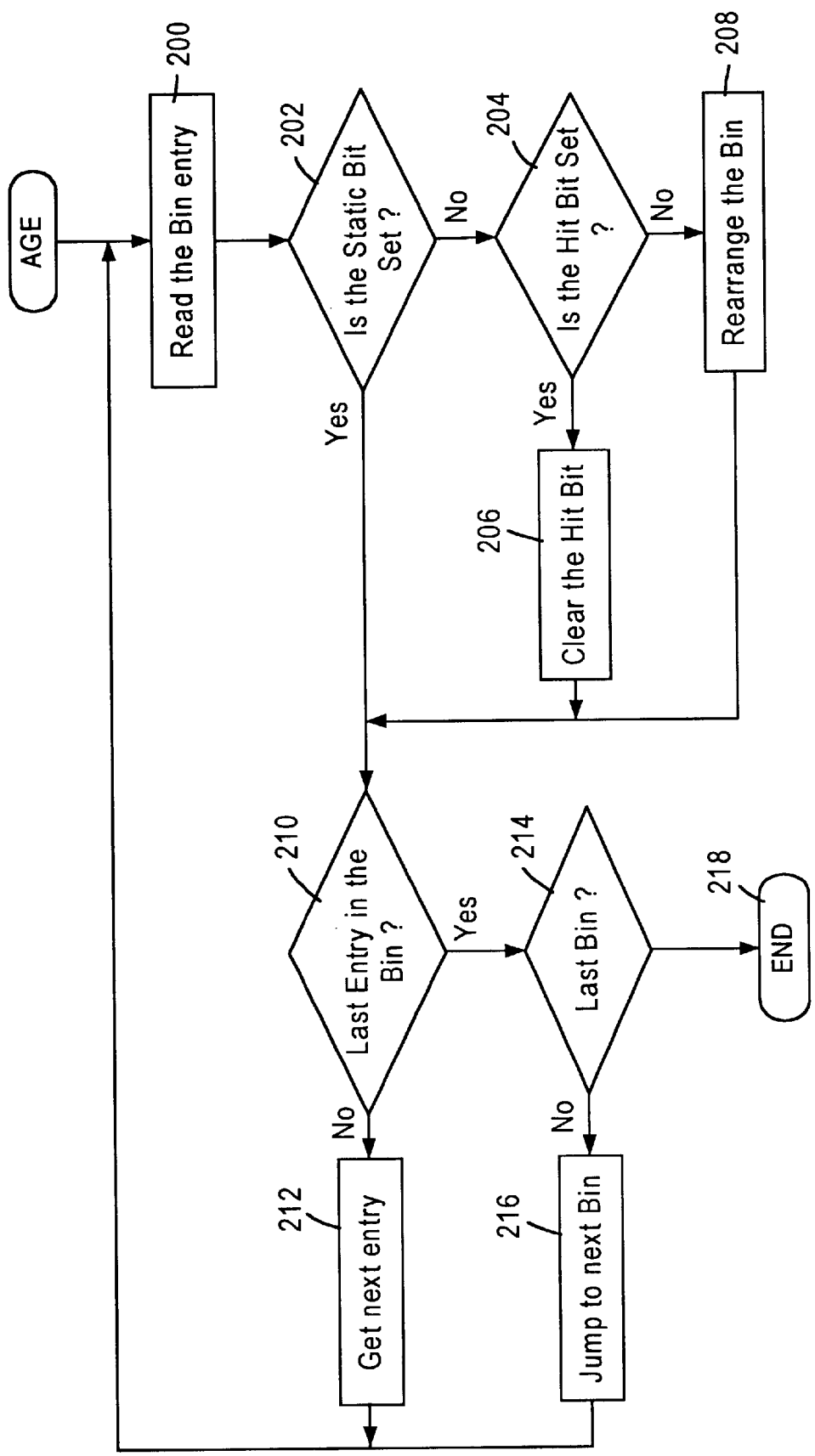
FIG. 9 is a flow diagram illustrating an aging function according to an embodiment of the present invention.

FIG. 9 is a flow diagram illustrating the method of aging entries, according to an embodiment of the present invention. Referring to FIG. 9 at step 200, the IRC controller 82 reads the first bin entry in bin 0. Next, at step 202, the IRC controller 82 determines if the static bit is set. If the static bit is not set, the IRC controller 82 determines if the hit bit is set, at step 204. If the IRC controller 82 determines the hit bit is set at step 204, the IRC controller 82 clears the hit bit at step 206. If the IRC controller 82 determines the hit bit is not set at step 204, the IRC controller 82 invalidates the address entry and rearranges the bin at step 208, to bypass the invalidated entry.

If the IRC controller 82 determines the static bit is set at step 202 or the hit bit has been cleared at step 206 or the bin has been rearranged at step 208, the IRC controller 82 then determines if the address entry is the last entry in the bin, at step 210. If the address entry is not the last entry in the bin, the IRC controller 82 reads the next entry at step 212 and returns to step 200 to repeat the process.

If the IRC controller 82 determines the entry is the last entry in the bin at step 210, the IRC controller 82 determines if the bin is the last bin at step 214. If the bin is not the last bin, the IRC controller 82 jumps to the next bin at step 216. Otherwise, the IRC controller 82 has completed the aging algorithm at step 218. The aging algorithm is then repeated after the aging timer has timed out.

In this manner, the IRC controller 82 performs an aging algorithm to invalidate address entries for stations whose static bit is not set and have not transmitted data in a predetermined amount of time. The host CPU 32 may also change the static bit field for any address entry at any time, e.g., during switch 12 runtime, via CPU IF 50, based on the particular network requirements. The aging function described above enables the IRC 40 to store address entries that are more frequently used, thereby decreasing the latency of the switch.

Testing Aging Function

As discussed previously, the aging function enables the IRC 40 to invalidate address entries for stations that may no longer be active on the network. This enables the switch 12 to learn new addresses for active stations and to provide switching decisions in a quick, efficient manner. Aging out address entries for ports whose address information has changed due to moving locations and learning the new addresses also enables the switch 12 to avoid transmitting data to the wrong port(s).

In accordance with an embodiment of the present invention, the host CPU 32 sets an aging override bit, i.e., the static bit, for address entries that are not to be invalidated by the aging function. Typically, a set static bit indicates that the address entry was programmed by the host CPU 32. The host CPU 32 is also able to change the static bit for any address entry at any time via CPU IF 50.

When a frame is received by the switch 12 and the IRC controller 82 finds an address entry whose address field and VLAN index fields match the SA and VLAN index of the received frame, the IRC controller 82 sets the hit bit for that address entry. The aging function then polls the static bit and hit bit at regular intervals to determine whether to invalidate a particular address entry.

Testing the aging algorithm to ensure that the IRC 40 is performing the aging function properly is also important to ensure that address entries are not inadvertently invalidated and overwritten. However, using a simulation process to store address entries and then "walk through" all the address entries to test the aging function would typically require a considerable amount of time, e.g., about ten hours or more.

The present invention advantageously includes an IRC test mode in which the IRC aging function is tested in an efficient manner by accelerating the aging process and then checking whether the IRC 40 performed the appropriate actions. According to an embodiment of the invention illustrated in FIG. 4, an IRC test mode register 130 is used to set the IRC 40 into an aging test mode. In the exemplary embodiment, the IRC test mode register 130 is located in the configuration and status registers 52. However, in alternative configurations, IRC test mode register 130 may be located in the IRC 40.

When the host CPU 32 wishes to test the IRC aging function, the host CPU 32 sends a test mode enable signal to the IRC test mode register via CPU IF 50. In the exemplary embodiment, the host CPU 32 functions as the testing agent. Alternatively, an external test generator may be used in connection with the testing function.

Figure 10:
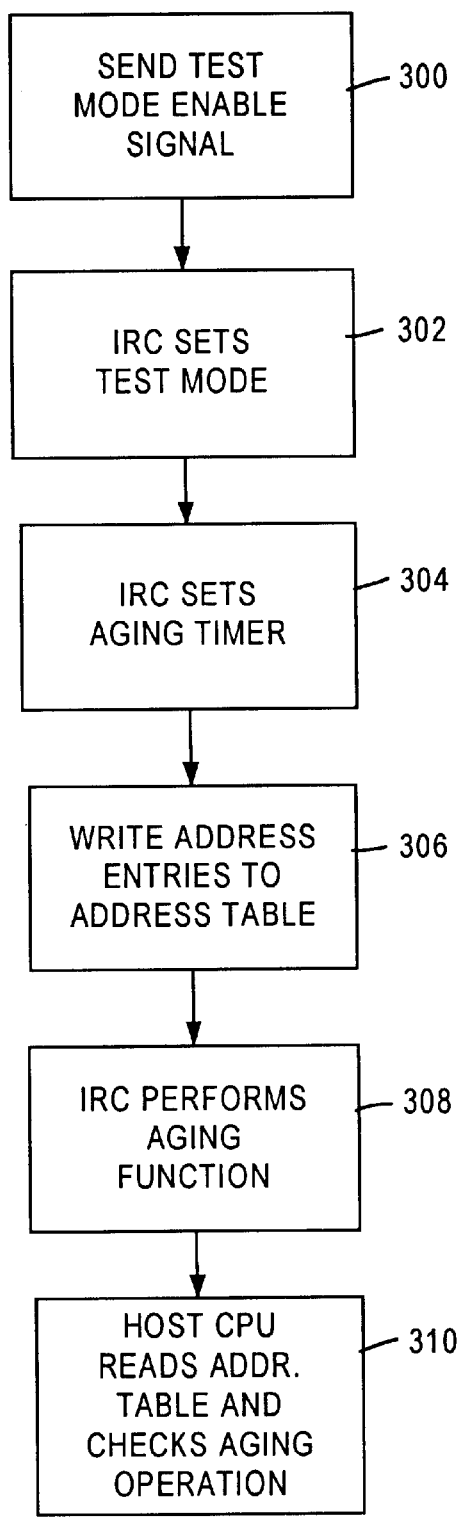
FIG. 10 is a flow diagram illustrating testing of the aging function according to an embodiment of the present invention.

FIG. 10 is a flow diagram illustrating the method of testing the aging function according to an embodiment of the present invention. At step 300, the host CPU 32 sends a test mode enable signal to the switch 12 via CPU IF 50. Next, the IRC 40 reads the test mode register 130 and determines that the IRC test mode is set at step 302.

The IRC controller 82 then sets the aging timer to a predetermined value, e.g., 100–200 nanoseconds, at step 304. The aging timer may be set to other values based on the particular testing requirements. However, in general, the aging timer is set to a time value to allow the IRC 40 to perform the aging algorithm quickly, as compared to normal conditions where the aging timer default value is set to 300 seconds. Accordingly, under typical test scenarios, the IRC aging timer would be set to a relatively short time period.

Next, the host CPU 32 writes address entries to the address table 84 via the host CPU IF 50, at step 306. Alternatively, the host CPU 32 may use the actual address entries stored in the address table 84 at the time of the test. For testing purposes, the host CPU 32 may write any number of entries up to the 4096 entry capacity of the address table 84.

Next at step 308, the host CPU 32 begins testing the operation of the IRC aging function. For example, the host CPU 32 may first wish to test the operation of the static bit in connection with the aging function. In this scenario, the host CPU 32 may write address entries to the address table 84 with the static bit set to "1". The IRC controller 82 then polls the address entries in accordance with the steps illustrated in FIG. 9. The IRC 40, when operating properly, does not invalidate address entries with a static bit set to "1".

The host CPU 32, at step 310, then reads the contents of the address table 84 via the CPU IF 50 to determine if the IRC controller 82 invalidated any address entries in which the static bit was set. This test indicates whether the IRC controller 84 aging function is operating properly in connection with the static bit.

The host CPU 32 may then decide to test the aging function in which the address entries do not include a set static bit. In this scenario, the host CPU 32 clears the static bit field and may set all the hit bits to "0". In this scenario, the IRC controller 82 reads each address entry and, when operating in accordance with the steps illustrated in FIG. 9, invalidates all the entries.

The host CPU 32 then reads the contents of the address table 84 via the CPU IF 50 to determine if the IRC controller 82 properly invalidated the entries in which the static and hit bit fields were both set to "0". This test indicates whether the IRC controller 84 aging function is operating properly in connection with the hit bit and static bit.

The host CPU 32 may next test the aging function for address entries containing a more typical distribution in which the address entries include all combinations of set/clear hit and static bits. In this scenario, the host CPU 32, at step 306, writes a variety of address entries in which the hit bit and static bit are set/clear. The IRC controller 82 then polls each entry in accordance with the steps illustrated in FIG. 9.

The host CPU 32 then reads the address table 84 to check whether the IRC controller 82 invalidated address entries only in cases where both the static bits and hit bits were not set. The IRC controller 82 then polls the address entries a second time, upon timeout of the aging timer. On the second polling, the IRC controller 82 invalidates those entries where the static bit was not set and the hit bit was initially set, with the hit bit having been cleared after the first polling. The host CPU 32 then reads the address table 84 and determines whether the IRC controller 82 is properly clearing the hit bit after polling an address entry.

In the manner described above, the host CPU 32 determines if the IRC aging function is operating properly. Advantageously, the host CPU 32 determines if the IRC 40 "ages" entries and invalidates aged entries in accordance with the prescribed logic. The host CPU 32 is able to perform any variety of tests by writing specific data to the address table 84 or manipulating existing data in the address table 84.

Described has been a system and method for testing an aging function in a network interface device. An advantage of the invention is that the aging function can be tested in an efficient manner with little additional processing overhead. Another advantage of the invention is that the test function requires little additional hardware on the switch.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A multiport switch configured for controlling communication of data frames between stations, comprising:
   a table for storing address information as address entries in a plurality of bins, the address entries containing an address hit field and an aging override field;

a programmable register configured to receive a test mode activation signal from an external test device; and a control device configured to operate in a test mode based on the contents of the programmable register, wherein the control device, when operating in the test mode, is configured to:

poll the address entries at predetermined times based on a timer value, determine whether to invalidate an address entry based on the contents of the address hit field and the aging override field, and invalidate an address entry and rearrange the respective bin, based on the contents of the address hit field and aging override field.

2. The multiport switch of claim 1, wherein the control device is configured to:

invalidate an address entry and rearrange the respective bin when the address hit field and aging override field are not set.

3. The multiport switch of claim 2, wherein the control device is further configured to:

clear the address hit field, after polling the address entry, when the aging override field is not set.

4. The multiport switch of claim 1, wherein the address table further comprises an address field, a virtual local area network (VLAN) field, a receive port number field and a port vector field.

5. The multiport switch of claim 1, wherein the address hit field comprises a hit bit, wherein a set hit bit in a particular address entry indicates that the address information contained in the address entry matched a source address and VLAN index associated with a received data frame.

6. The multiport switch of claim 5, wherein the aging override field comprises a static bit, wherein a set static bit in a particular entry indicates that the particular entry has been programmed and that the entry is not to be invalidated.

7. The multiport switch of claim 1, comprising:

a programmable timer that provides a signal to the control device at predetermined periods of time based on the timer value.

8. In a multiport switch that controls communication of data frames between stations, the multiport switch including an address table for storing address entries in a plurality of bins, a method of testing an aging function comprising:

storing address entries in the address table, the address entries comprising an address hit field and an aging override field;

transmitting a test mode activation signal to a decision making engine located on the multiport switch;

polling the address entries at predetermined periods of time;

determining whether to invalidate an address entry based on the contents of the address hit field and the aging override field;

invalidating an address entry and rearranging a particular bin, based on the determining step; and reading the contents of the address table to determine if the aging function operated properly.

9. The method of claim 8, wherein the determining step comprises:

polling a first address entry in a first bin of the address table;

determining whether the aging override field and address hit fields are set; and invalidating the address entry when both the aging override field and address bit field are not set.

10. The method of claim 9, comprising:

clearing the address hit field of the address entry, after polling the address entry, when the aging override field is not set.

11. The method of claim 8, comprising:

repeating the determining step for each address entry in the first bin;

repeating the determining step for each bin in the address table; and reading the address table to determine whether the aging function is operating properly.

12. The method of claim 11, comprising:

modifying the address hit field and aging override field of the respective address entries;

performing the aging function; and reading the address table to determine whether the aging function is operating properly.

13. A multiport switch configured for controlling communication of data frames between stations, comprising:

a table configured for storing test data as address entries in a plurality of bins, the address entries comprising an address hit field and an aging override field;

a programmable timer that provides a signal at predetermined periods of time based on a timer value; and a control device configured to operate in a test mode in response to a test mode activation signal from an external device, wherein the control device, when operating in the test mode, is configured to:

poll the address entries at predetermined times based on the timer value, determine whether to invalidate an address entry based on the contents of the address hit field and the aging override field, and invalidate an address entry and rearrange the respective bin, based on the contents of the address hit field and aging override field.

14. The multiport switch of claim 13, wherein the control device is configured to:

invalidate an address entry and rearrange the respective bin when the address hit field and aging override field are not set.

15. The multiport switch of claim 14, wherein the control device is further configured:

clear the address hit field, after polling the address entry, when the aging override field is not set.

16. The multiport switch of claim 13, wherein the address table further comprises an address field, a virtual local area network (VLAN) field, a receive port number field and a port vector field.

17. The multiport switch of claim 16, wherein:

the address hit field comprises a hit bit, a set hit bit in a particular address entry indicating that the address information contained in the address entry matched a source address and VLAN index associated with a received data frame, and the aging override field comprises a static bit, a set static bit in a particular entry indicating that the particular entry was programmed and that the entry is not to be invalidated.

18. The multiport switch of claim 13, comprising:

a test mode register configured to receive the test mode activation signal from the external device and to store test mode indicator information.

* * * * *